June 5, 1945.  L. A. FINZI  2,377,622

RECORDING AND COUNTING DEVICE

Filed Sept. 10, 1943

Fig. 3. Transparent Insulation

WITNESSES:

INVENTOR
Leo A. Finzi.
BY
ATTORNEY

Patented June 5, 1945

2,377,622

UNITED STATES PATENT OFFICE 2,377,622

RECORDING AND COUNTING DEVICE

Leo A. Finzi, Irwin, Pa., assignor to Westinghouse Electric & Manufacturing Company, East Pittsburgh, Pa., a corporation of Pennsylvania Application September 10, 1943, Serial No. 501,801

3 Claims. (Cl. 234—1.5)

The invention relates to recording and counting devices, with particular reference to recording or counting the number of occurrences of a transient in an electric circuit, such, for example, as the number of times a lightning arrester associated with such circuit operates in response to current and voltage surges.

It is common practice to connect lightning arresters at various points in transmission and distribution circuits, so that upon the occurrence of a fault the attendant voltage disturbance in the circuit may be drained off to ground to protect apparatus associated with the circuit. Such arresters include a gap in series with a conductor from the circuit to ground which flashes over in response to a voltage rise, but which, of course, under normal voltage conditions serves as an insulator.

It is desirable to collect information about the frequency of direct lightning-discharges through lightning arresters in the field. The available recording instruments require the use of special sensitive electromagnetic counters which require networks to increase the duration of the extremely short surge action. The practical use of such counters is limited by their inherent complication and cost. Also, in the past, the operation of the arrester has been detected by inserting a thin sheet of paper in the arc-gap which punctures when a surge passes through the arrester. The difficulty here is that after one discharge through the arrester no indication is obtainable for subsequent surges without changing the paper.

It is an object of the present invention to produce a simple inexpensive counter or recorder which will successively respond to a plurality of lightning arrester operations before it has to be renewed.

It is a further object of the invention to produce a counting device responsive to a plurality of occurrences of a transient condition of an electric circuit.

It is a further object of the invention to provide a device for measuring the magnitude of recurrent transient conditions on an electric circuit.

Referring to the drawing,

Fig. 3 is an enlarged fragmentary view in section of a modification of the invention corresponding to the section shown in Fig. 2.

Figure 4:
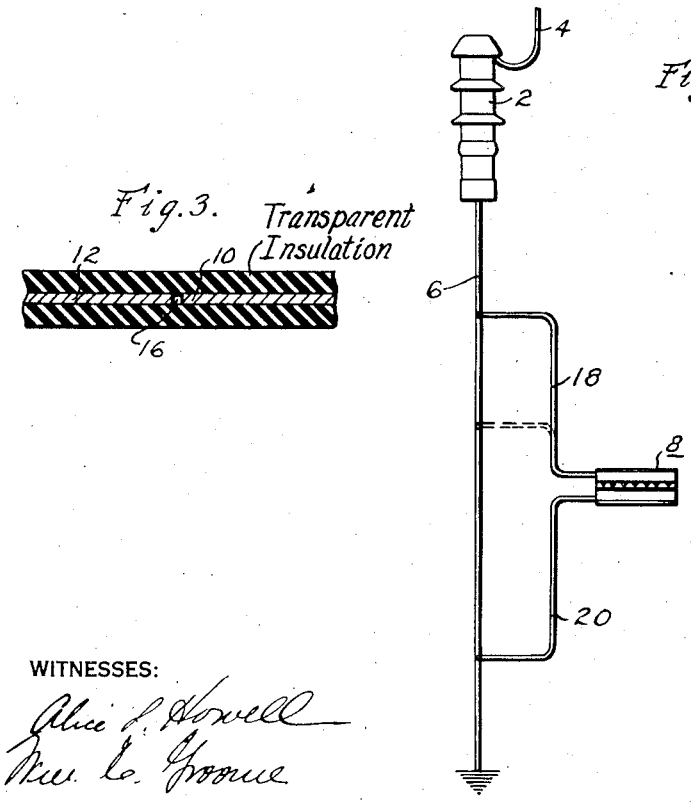
Fig. 4 is a schematic view of the method of connecting the device of Fig. 1 in the circuit of a protective lightning arrester.

Referring first to Fig. 4, a lightning arrester 2 is provided with a terminal 4 for connection with a circuit to be protected, and has a lower terminal connected to a grounded lead 6. At spaced points on the lead 6, conductors extend to the counter or recorder 8 to be energized in accordance with the inductive drop between the spaced points on the grounded lead.

Figure 1:
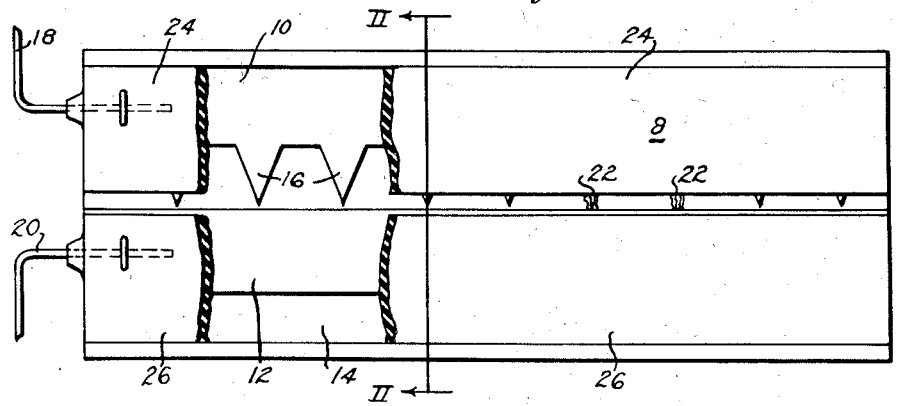
Figure 1 is a plan view with parts broken away of the counter or recorder of the present invention.

Referring now to Fig. 1, the recorder consists essentially of a pair of conducting strips 10 and 12 mounted upon an insulating base 14, which preferably is of fiber, cellulose acetate, or other organic non-carbonizing insulating material. The strip 10 is provided with a number of points or projections 16 which extend toward, but terminate short of, the longitudinal edge of the strip 12. Any desired number of these points may be provided depending, of course, upon the practical length of the recording device 8.

The points 16 along with the edge of the strip 12 constitute a series of parallel connected arcgaps, and to each of the strips is secured in any suitable manner terminal wires 18 and 20 which, as indicated in Fig. 4, are secured to spaced points on the ground leads 6.

In the present instance and in the interest of simplicity, the strips 10 and 12 are formed of relatively thin metal foil, such as "tin foil," so that when a portion of the surge current passing through the lightning arrester is impressed upon the strips, the points 16 are of such character that they will burn when the arc-gaps defined thereby flash over. It has been found through repeated tests that upon the occurrence of such surge only one of the points 16 will be subject to a discharge and burn or volatilize. Although the strip 10 may be formed by punching from a blank, there is always sufficient differences in the dimensions, shape, etc., of the series of points 16 that only one of them will be subject to a discharge to the strip 12. Accordingly, at any time, the number of operations of the lightning arrester may be determined by counting the number of burned tips or points 16.

As a further indication of the number of operations, when a point 16 flashes over to the strip 12, the adjacent portion of the base 14 will be charred, as indicated at 22 in Fig. 1. This has an additional and important advantage in that the charring of the area on the base results in a small blast of gas which helps to clear the metallic vapors from the surrounding gap region which might otherwise tend to form a permanent conducting path to the strip 12. For this reason, it is also important that the base 14 be of a non-carbonizing material.

Figure 2:
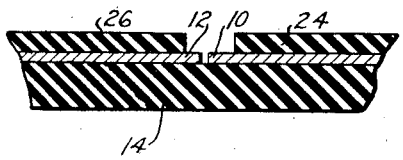
Fig. 2 is an enlarged fragmentary view in section taken on the line II—II of Fig. 1.

As shown in Figs. 1 and 2, strips of insulating material 24 and 26 overlie the strips 10 and 12. These may completely cover the strips except that the tips of the points 16 and the edge of the strip 12 are left exposed. In the modification shown in Fig. 3, the strips are completely enclosed, thereby enclosing the gaps between the point 16 and the strip 12. This necessitates, of course, making the insulation transparent at least on one side of the strips, so that the number of operations may be counted. For this purpose any of the transparent plastics now available may be molded around the strips 10 and 12 resulting in an inexpensive and effective manufacturing operation.

Referring again to Fig. 4, it is intended that the spaced connections of conductors 18 and 20 on the ground lead 6 may be varied, as indicated by the dotted line showing, to shunt more or less of the surge current through the recorder 8 as desired to meet practical operating conditions. Further, a plurality of recorders 8 may be connected to the lead 6 with conductors such as 18 and 20 connected at points of different spacings to be responsive to surges of different magnitudes. Accordingly, by observing which of the recorders have fired after a surge, a rough measurement of the magnitude of the surge is afforded.

Obviously, instead of directly connecting conductors 18 and 20 to lead 6, they may be inductively coupled as by a loop surrounding the lead.

In accordance with the present invention, an inexpensive, but effective, counter or recorder is provided which may be used in a simple manner to count the successive occurrences of transients on an electric circuit, and although many modifications may be made of the general construction described, it is intended that the invention be limited only by the scope of the appended claims.

I claim as my invention:

1. In a device for counting the number of current surges in an electric circuit, a pair of conducting members disposed in spaced parallel relation, a plurality of points formed on one of said members and extending toward but spaced from said other member to constitute a plurality of parallel arc-gaps for said surge current, each of said points being of a metal which melts and vaporizes when a surge current discharges across its associated gap, and means responsive to the discharge of a gap to generate a gas discharge to clear the gap of metal vapor resulting from the melting of a gap point.

2. In a device for counting the number of current surges in an electric circuit, a pair of conducting members disposed in spaced parallel relation, a plurality of points formed on one of said members and extending toward but spaced from said other member to constitute a plurality of parallel arc-gaps for said surge current, each of said points being of a metal which melts and vaporizes when a surge current discharges across its associated gap, and means responsive to the discharge of a gap to generate a gas discharge to clear the gap of metal vapor resulting from the melting of a gap point comprising a sheet of organic material disposed behind said gap points in a position to be affected by the gap discharges.

3. In an electrical surge current counting device, a pair of conducting strips of metal foil, means for making an electrical connection to each strip, means for supporting said strips in parallel spaced relation including a base member of organic non-carbonizing material, a plurality of integral projecting points on one of said strips extending toward and spaced from the longitudinal edge of the other strip constituting a plurality of arc-gaps, said points being of a material which melts upon a discharge across the gap in response to a surge current, and an insulating covering overlying said strips.

LEO A. FINZI.